Patented Dec. 17, 1946

2,412,799

UNITED STATES PATENT OFFICE 2,412,799

THIOCYANO ALKYL ETHERS OF ENDO-ETHYLENE CYCLOPENTANOLS

Herman A. Bruson, Philadelphia, Pa., assignor to The Resinous Products & Chemical Company, Philadelphia, Pa., a corporation of Delaware No Drawing. Application September 23, 1944, Serial No. 555,585

6 Claims. (Cl. 260—454)

This invention relates to thiocyano aliphatic ethers of endoethylene substituted cyclopentanols having the formula:

$$R-(O-A)_n-SCN$$

wherein R is a 3,5-endoethylene substituted cyclopentane radical, A is an alkylene group of at least two carbon atoms, and $n$ is a small integer.

These new compounds may be readily prepared according to this invention by reacting an aliphatic halogenated alcohol:

$$HO-A-(O-A)_{n-1}-X$$

wherein A is an alkylene group of at least two carbon atoms, $n$ is a small integer, and X is a halogen, with an adduct of cyclopentadiene and a mono-olefine in the presence of an acidic condensing agent, such as a boron trifluoride catalyst or sulfuric acid, to form an ether halide having the formula:

$$R-(O-A)_n-X$$

and subsequently replacing the halogen group, X, by a thiocyano group in the conventional manner, by heating with a salt of thiocyanic acid, such as ammonium thiocyanate, potassium thiocyanate, sodium thiocyanate, barium thiocyanate, or the like. An alternative method is to react a thiocyano alcohol directly with an adduct of cyclopentadiene and a mono-olefine in the presence of an acidic condensing agent such as boron trifluoride or sulfuric acid.

Typical adducts of cyclopentadiene and monoolefinic compounds which can be used are the so-called Diels-Alder addition products of cyclopentadiene with a variety of unsaturated hydrocarbons, esters, alcohols, and ethers; for example, styrene, indene, ethylene, allyl chloride, allyl acetate, vinyl chloride, vinyl acetate, allyl alcohol, allyl isothiocyanate, eugenol, safrole, and the like. Adducts of cyclopentadiene with allyl ethers or allyl thioethers can also be used.

These adducts react with alcohols containing halogen or thiocyano groups in the presence of acidic catalysts such as sulfuric acid, boron trifluoride, or coordination complexes of boron trifluoride with oxygenated compounds, including ethers, alcohols, ketones, aldehydes, and other oxygen-containing organic compounds, to yield addition-rearrangement products having ether groups as described in copending applications Serial Nos. 529,191, filed April 1, 1944; 529,195, filed April 1, 1944; and 537,183, filed May 24, 1944, of which the present application is a continuation-in-part, and wherein full details are presented as to catalysts and conditions of reaction of alcohol and the starting adduct.

As typical thiocyano alcohols, there may be mentioned thiocyanoethanol, thiocyanopropanol, thiocyanobutanol, thiocyanoethoxyethanol, thiocyanopropoxypropanol, thiocyanobutoxybutanol, thiocyanoethoxyethoxyethanol, thiocyanoethoxyethoxyethoxyethanol, and other polyalkylene thiocyano alcohols. Of particular interest are the thiocyano ether alcohols such as are claimed in my application Serial No. 526,483, filed March 14, 1944, now United States Patent No. 2,372,809, issued April 3, 1945, which alcohols are of the formula:

$$NCS-CH_2\overset{Y}{C}H-\left(OCH_2\overset{Y}{C}H\right)_n-OH$$

wherein Y is a hydrogen or methyl and $n$ is an integer from one to three inclusive.

When halogenated alcohols are used, there may be reacted ethylene chlorohydrin or bromohydrin, propylene chlorohydrin or bromohydrin, butylene chlorohydrin or bromohydrin, chloroethoxyethanol, chloroethoxyethoxyethanol, chloroethoxyethoxyethoxyethanol, the corresponding bromo alcohols, the corresponding propylene or butylene ether alcohols, and halo ether alcohols with additional polyalkoxy groups.

The reaction of the alcohol and adduct of cycylopentadiene and a mono-olefinic compound is readily effected in the presence of one or more acidic condensing agents. The alcohol adds to the double bond of the cyclopenteno ring of the adduct and simultaneously there occurs a rearrangement to a new ring system wherein an endoethylene cyclopentano ring is formed to which the ether substituent resulting from the addition of the alcohol is attached. The reaction of alcohol and adduct may be initiated by mixing the reactants and catalyst at room temperature or at elevated temperatures or even at temperatures as low as 0° C. It is generally desirable to control the temperature at the start, but the reaction may be carried to completion by continuing the reaction for a long time or by raising the temperature. While temperatures of 50° C. to 125° C. are to be preferred, even higher temperatures may be used in some cases.

The products are then worked up by removing the condensing agent, as by washing with water or neutralization, and suitably purifying, as by distillation, stripping, extracting, charcoaling, or the like procedural steps.

If the addition-rearrangement product has been made with a halo alcohol, it is, of course, necessary to convert the new halo ether to the desired thiocyano ether. This conversion may be accomplished by mixing the new halo ether with a salt of thiocyanic acid. There may be used in the conversion a solvent such as water, acetone, alcohol, toluene, or methyl isobutyl ketone. The mixture may be heated at 50° C. to 150° C. to complete the reaction and the resulting product worked up by the usual procedures.

The new products obtained according to this invention are intended primarily for use as toxicants in the preparation of insecticides for use against flies, mosquitoes, and other pests.

The invention is illustrated by the following examples:

Example 1

A mixture of 29.4 grams of β-thiocyanoethoxyethanol, three grams of boron trifluoride-dibutyl ether complex, $BF_3.O(C_4H_9)_2$, and 14.1 grams of cyclopentadiene-ethylene adduct (Joshel and Butz, J. Amer. Chem. Soc. 63, 3351 (1941)) was stirred at 95° to 97° C. for three and one-half hours. The product was washed with dilute soda solution, then with water, dried, and distilled in vacuo. The β-thiocyanoethoxyethoxy-3,5-endoethylene cyclopentane:

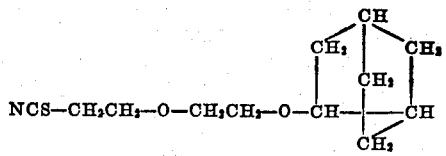

distilled over between 160° and 170° C. at 2 mm. as a colorless oil in a yield amounting to 23 grams. Upon redistillation, the pure compound boiled at 164° C./2 mm.

Example 2

A mixture of 14.7 grams of β-thiocyanoethoxyethanol, three grams of $BF_3.O(C_4H_9)_2$, and 17 grams of cyclopentadiene-styrene adduct (Alder and Rickert, Ber. der Deut. Chem. Ges. 71, 384 (1938)) was stirred for seven hours at 95° C. The product was washed with dilute soda solution, then with water, dried, and distilled in vacuo. The β-thiocyanoethoxyethoxy-3,5-endoethylene-5-phenyl cyclopentane having the probable formula:

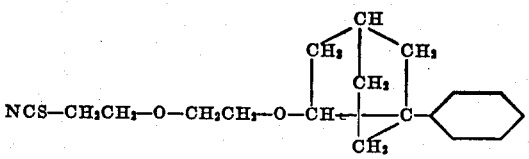

distilled over at 225° to 235° C./2 mm. as a pale yellow oil. Upon redistillation, the pure compound boiled at 222° to 227° C./1.5–2 mm.

Example 3

To a stirred mixture of 161 grams of ethylene chlorohydrin and five grams of $BF_3.O(C_4H_9)_2$ at 85° C. there was added, dropwise, during the course of forty minutes 182 grams of cyclopentadieneindene adduct:

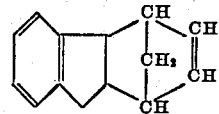

(Alder and Rickert, Ber. der Deut. Chem. Ges. 71, 386 (1938)). The mixture was then warmed gradually to 97° C. and held there for six hours with constant stirring. The dark liquid was washed with dilute sodium hydroxide solution, then with water, dried, and distilled in vacuo. The β - chloroethoxyendoethylene cyclopentanoindane having the probable formula:

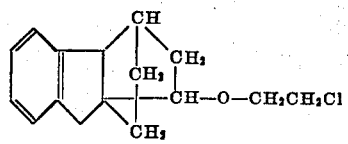

distilled over at 90° to 115° C./1.5–2 mm. as a colorless oil.

A mixture of 220 grams of the above oil, 98 grams of NaSCN, 90 grams of methyl isobutyl ketone, 9 grams of β-ethoxyethanol, one gram of copper powder, and one gram of sodium bromide was stirred and boiled under reflux for twenty-four hours. The product was washed, filtered, dried, and distilled in vacuo to yield 202 grams of β - thiocyanoethoxyendoethylene cyclopentanoindane having the probable formula:

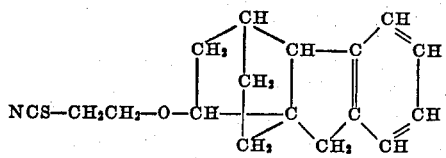

as a colorless oil boiling at 198° to 203° C./0.5 mm.

Example 4

To a stirred solution of 81 grams of ethylene chlorohydrin and two grams of $BF_3.O(C_4H_9)_2$ there was added, dropwise, at 70° to 90° C. a mixture of 80 grams of ethylene chlorohydrin and 94 grams of cyclopentadiene-ethylene adduct during the course of twenty-five minutes. The mixture was then stirred at 90° to 92° C. for seven hours, cooled, washed with dilute alkali and water, then dried, and distilled in vacuo. The β-chloroethoxyendoethylenecyclopentane:

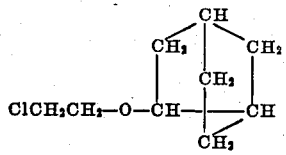

distilled over at 92° to 95° C./9 mm. as a colorless oil in a yield amounting to 155 grams.

A mixture of 155 grams of this oil, 102 grams of NaSCN, 94 grams of methyl isobutyl ketone, nine grams of β-ethoxyethanol, 0.5 gram of copper powder, and 0.5 gram of sodium bromide was boiled under reflux while the mixture was stirred for a period of twenty-four hours. The product was then washed, filtered, dried, and distilled in vacuo. The β-thiocyanoethoxyendoethylene cyclopentane distilled over as a colorless oil at 107° to 109° C. (0.5 mm.) in a yield of 126 grams. It has the formula:

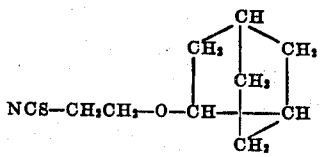

Example 5

A mixture of 29.4 grams of β-thiocyanoethoxyethanol, three grams of BF₃.O(C₄H₉)₂, and 45.6 grams of cyclopentadieneallyl benzoate adduct:

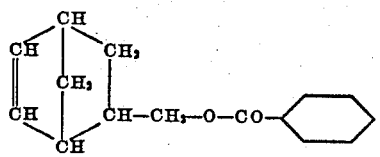

was stirred at 95° C. for six hours. The product was then cooled, washed with dilute soda solution and water, dried, and distilled in vacuo. The thiocyanoethoxyethoxyendoethylene benzoyl oxymethyl cyclopentane having the probable formula:

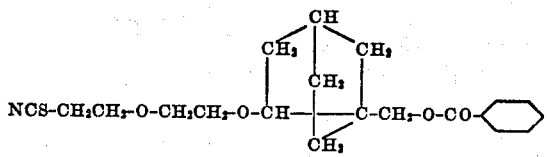

distilled over at 260° to 266° C./1.5 mm. as a viscous pale-yellow oil.

Example 6

A mixture of 94.1 grams of β-thiocyanoethoxyethanol, three grams of BF₃.O(C₄H₉)₂, and 45.6 grams of cyclopentadiene-vinyl acetate adduct was stirred at 90° C. for eight hours. The cooled product was then washed with dilute soda solution, and with water, dried, and distilled in vacuo. The thiocyanoethoxyethoxy endoethylene acetoxy cyclopentane having the probable formula:

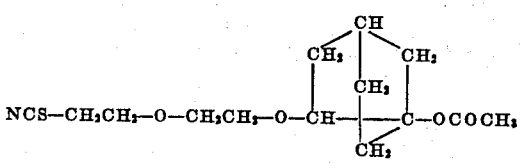

distilled over at 190° to 196° C./1 mm. as a pale yellow oil.

Example 7

To a stirred mixture of 130 grams of ethylene chlorohydrin and three grams of BF₃.O(C₄H₉)₂ at 98° C. there was gradually added 138 grams of cyclopentadiene-styrene adduct during the course of forty minutes. The mixture was stirred at 95° C. for six and one-half hours longer, then washed with dilute sodium hydroxide solution and with water, dried, and distilled in vacuo. The β-chloroethoxy endoethylene phenyl cyclopentane having the probable formula:

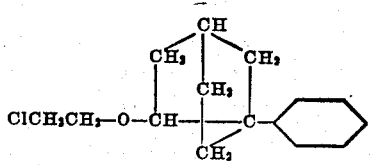

distilled over at 145° to 150° C./0.5 mm. as a colorless oil in a yield of 135 grams.

This oil (135 grams) was mixed with 63 grams of NaSCN, 58 grams of methyl isobutyl ketone, six grams of β-ethoxyethanol, one gram of copper powder, and one gram of sodium bromide. The mixture was stirred and boiled under reflux for twenty-four hours. The product was then washed with water, filtered, and distilled in vacuo to yield 113 grams of β-thiocyanoethoxy endoethylene phenyl cyclopentane as a pale yellow oil boiling at 185° to 195° C./1–2 mm. and having the probable formula:

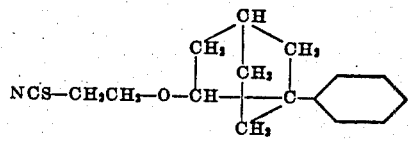

Example 8

A mixture consisting of 108 grams of ethylene chlorohydrin, four grams of BF₃.O(C₄H₉)₂, and 134 grams of cyclopentadiene-allyl phenyl ether adduct:

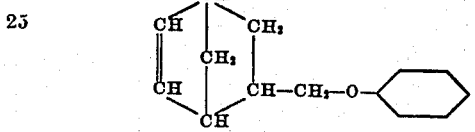

was stirred at 95° C. for six hours, washed with soda solution and with water, dried, and distilled in vacuo to yield 138 grams of β-chloroethoxy endoethylene phenoxymethyl cyclopentane having the probable formula:

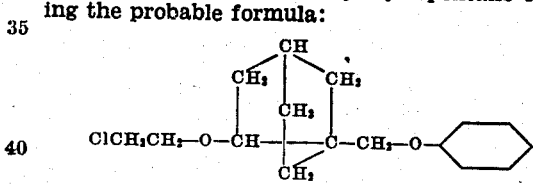

as a colorless oil boiling at 166° to 169° C./1 mm.

This oil (138 grams) was mixed with 57 grams of NaSCN, 54 grams of methyl isobutyl ketone, one gram of copper powder, one gram of sodium bromide, and ten grams of β-ethoxyethanol and boiled for twenty-four hours under reflux with constant stirring. The washed product yielded the corresponding thiocyanate:

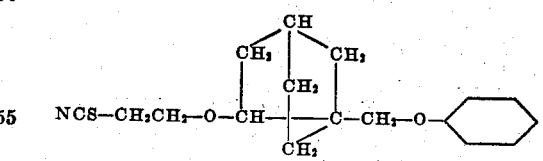

as a pale yellow oil boiling at 198° to 200° C./0.5 mm.

Example 9

To a stirred mixture of 160 grams of ethylene chlorohydrin and six grams of BF₃.O(C₄H₉)₂ at 90° C. there was added, dropwise, 148 grams of cyclopentadiene-vinyl acetate adduct:

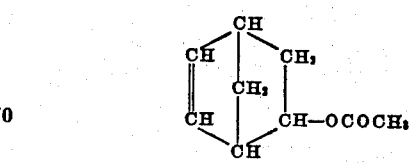

during the course of twenty-five minutes. The mixture was then heated at 95° C. for six hours, cooled, washed with dilute soda solution and with water, dried, and distilled in vacuo to yield 86 grams of chloroethoxy endoethylene acetoxy cyclopentane:

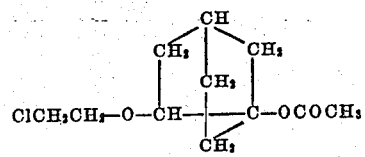

as a colorless oil boiling at 108° to 115° C./1-2 mm.

A mixture of 96 grams of this oil, 35 grams of NaSCN, 32 grams of methyl isobutyl ketone, 0.5 gram of NaBr, and one gram of copper powder was boiled under reflux with stirring for twenty-four hours. The product was washed, filtered, dried, and distilled in vacuo to yield the corresponding β-thiocyanoethoxy endoethylene acetoxy cyclopentane:

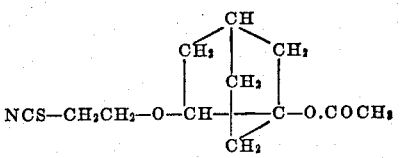

as a pale yellow oil boiling at 164° to 166° C./1 mm.

*Example 10*

To a stirred solution of 101 grams of ethylene chlorohydrin and five grams of $BF_3.O(C_4H_9)_2$ at 90° to 95° C. there was added dropwise 158 grams of cyclopentadiene-safrole adduct:

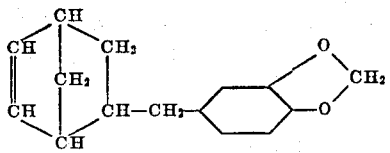

The mixture was heated for eight and one-half hours at 95° C. and then was washed with soda solution and with water, dried, and distilled in vacuo to yield 110 grams of β-chloroethoxy endoethylene methylene dioxybenzyl cyclopentane:

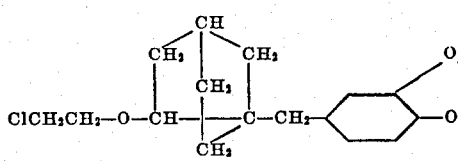

as a viscous oil boiling at 180° to 190° C./1 mm.

This was converted to the corresponding thiocyanate by boiling for twenty-four hours with an equimolecular proportion of sodium thiocyanate in methyl isobutyl ketone with a trace of copper and sodium bromide as catalyst, as described in Example 9. The product, after being washed dried in vacuuo, consisted essentially of β-thiocyanoethoxy endoethylene methylene dioxybenzyl cyclopentane:

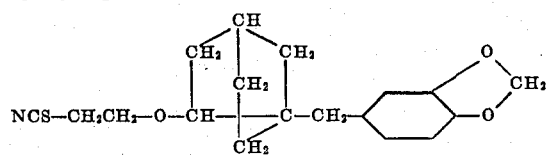

It is a pale yellow thick oil.

*Example 11*

To a stirred solution of 49 grams of ethylene chlorohydrin and three grams of $BF_3.O(C_4H_9)_2$ at 90° C. there was added, dropwise, 91.5 grams of the adduct of cyclopentadiene and 2,4,5-trichlorophenyl allyl ether:

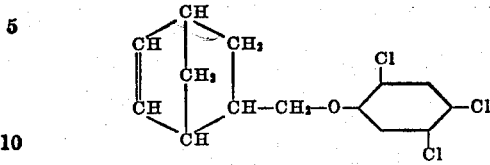

The mixture was stirred at 95° C. for six hours, then was neutralized, washed, dried, and distilled in vacuo to yield 88 grams of β-chloroethoxy endoethylene trichlorophenoxymethyl cyclopentane:

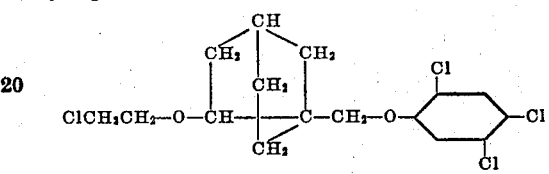

as a thick oil boiling at 210° to 213° C./0.5 mm.

This was converted to the corresponding thiocyanate as described in Example 10. The product, having the probable formula:

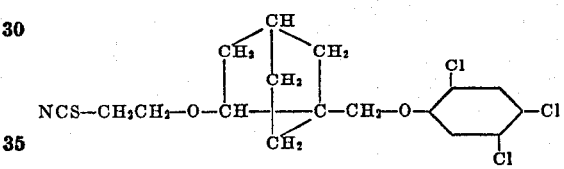

is a thick pale yellow oil boiling above 240° C./1 mm. with some decomposition.

*Example 12*

To a stirred solution of 80.5 grams of ethylene chlorohydrin and four grams of $BF_3.O(C_4H_9)_2$ at 95° C. there was added, dropwise, 88.5 grams of the adduct of cyclopentadiene and β-allyl-oxypropionitrile having the formula:

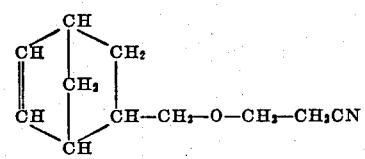

The mixture was stirred for seven hours at 95° to 97° C., then was cooled, washed, dried, and distilled in vacuo to yield 74 grams of the corresponding β-chloroethoxy endoethylene cyanoethoxymethyl cyclopentane:

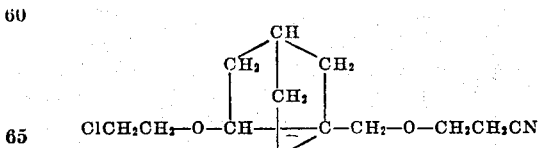

as a colorless oil boiling at 164° to 169° C./1 mm.

A mixture of 58 grams of the above oil, 24 grams of methyl isobutyl ketone, three grams of "Cellosolve," one gram of copper powder, and one gram of sodium bromide together with 30 grams of sodium thiocyanate was stirred at 130° to 134° C. for twenty-four hours, then was filtered, washed, dried, and distilled in vacuo to yield forty grams of the corresponding thiocyanate having the formula:

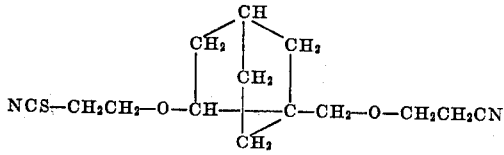

as a pale yellow oil boiling at 213° to 217° C./0.5 mm.

I claim:

1. A method for preparing thiocyano aliphatic ethers of endoethylene cyclopentanols which comprises reacting an aliphatic thiocyano alcohol of the formula HO—A—(O—A)$_{n-1}$—SCN, wherein A is an alkylene group of at least two carbon atoms and $n$ is a number from one to four, inclusive in the presence of a boron trifluoride catalyst with an adduct of cyclopentadiene and a mono-olefinic compound having only neutral substituents.

2. A method for preparing thiocyano aliphatic ethers of endoethylene cyclopentanols which comprises reacting β-thiocyano-ethoxyethanol in the presence of a boron trifluoride catalyst with an adduct of cyclopentadiene and a mono-olefinic compound having only neutral substituents.

3. As a new compound, a thiocyano aliphatic ether of an endoethylene cyclopentanol having the formula:

wherein R is a 3,5-endoethylene cyclopentane nucleus, A is an alkylene group of at least two carbon atoms, and $n$ is a small integer.

4. As a new compound, β-thiocyanoethoxy-3,5-endoethylene cyclopentanoindane, said compound being an oil which, when pure, boils at about 198° to 203° C./0.5 mm.

5. As a new compound, β-thiocyanoethoxyethoxy endoethylene cyclopentane having the formula:

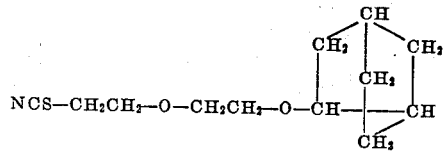

6. As a new compound, β-thiocyanoethoxy endoethylene cyclopentane having the formula:

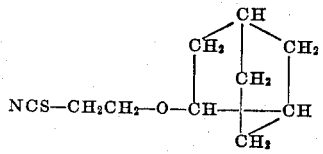

HERMAN A. BRUSON.